Dec. 23, 1952   H. R. NILSSON   2,622,787
HELICAL ROTARY ENGINE
Filed July 16, 1947   7 Sheets-Sheet 1

INVENTOR
Hans Robert Nilsson
BY
Jarvis O Marble
ATTORNEY

Dec. 23, 1952 H. R. NILSSON 2,622,787
HELICAL ROTARY ENGINE
Filed July 16, 1947 7 Sheets-Sheet 2

INVENTOR
Hans Robert Nilsson
BY
Jarvis C. Marble
his ATTORNEY

Dec. 23, 1952      H. R. NILSSON      2,622,787
HELICAL ROTARY ENGINE

Filed July 16, 1947      7 Sheets-Sheet 3

INVENTOR
Hans Robert Nilsson
BY
ATTORNEY

Dec. 23, 1952     H. R. NILSSON     2,622,787
HELICAL ROTARY ENGINE Filed July 16, 1947     7 Sheets-Sheet 4

INVENTOR
Hans Robert Nilsson
BY
ATTORNEY

Dec. 23, 1952        H. R. NILSSON        2,622,787
HELICAL ROTARY ENGINE Filed July 16, 1947        7 Sheets-Sheet 6

Dec. 23, 1952 H. R. NILSSON 2,622,787
HELICAL ROTARY ENGINE
Filed July 16, 1947 7 Sheets-Sheet 7

INVENTOR
Hans Robert Nilsson
BY
ATTORNEY

Patented Dec. 23, 1952

2,622,787

UNITED STATES PATENT OFFICE 2,622,787

HELICAL ROTARY ENGINE

Hans Robert Nilsson, Stockholm, Sweden, assignor, by mesne assignments, to Jarvis C. Marble, New York, N. Y., Leslie M. Merrill, Westfield, N. J., and Percy H. Batten, Racine, Wis., as trustees Application July 16, 1947, Serial No. 761,265

27 Claims. (Cl. 230—143)

This application is a continuation-in-part replacing my copending application Serial No. 684,495 filed July 18, 1946, and relates back thereto with respect to all common subject matter.

The present invention relates to rotary devices of the helical screw wheel type and has particular reference to such devices of the kind in which a gaseous fluid is compressed or expanded, as the case may be, in working spaces or chambers formed between intermeshing helically grooved rotors and the casing therefor, which chambers vary in volume as the rotors revolve. Typical examples of such devices are disclosed in U. S. Patents No. 2,174,522 and No. 2,243,874 granted to Alf Lysholm.

Devices of the kind under consideration are ordinarily operated dry, with the smallest practical clearance spaces being provided between the intermeshing rotors and between them and the casing, so as to reduce to a minimum the leakage of fluid from the working chambers, and in order to minimize the leakage, percentagewise, and thus maintain relatively high volumetric efficiency, the rotors are ordinarily operated at high peripheral or tip speeds. Furthermore, in order to secure the desired ratios of expansion or contraction of the working chambers between the times of registry thereof with the inlet and outlet ports, with rotors of uniform diameter and helix angle, it is necessary for the grooves of at least some of the rotors to have a helix angle of considerable magnitude. The nature of this magnitude will be more specifically referred to later. This in turn makes most advantageous the use of mating rotors one of which is provided with lands and grooves, at least the major portions of which and usually the whole or substantially the whole of which lie outside of the pitch circle of the rotor, with the addendums of the lands having profiles of convex curvature, while the other of the rotors is provided with lands and grooves at least the major portions and usually substantially the whole or the whole of which lie within the pitch circle of the rotor, with the dedendums of the lands having profiles of concave curvature. For convenience and brevity the former kind of rotor will hereinafter sometimes be referred to as a male rotor and the latter kind as a female rotor. In order to obtain an adequately uniform clearance or sealing line between the lands and grooves of the cooperating rotors it has generally been the practice with pairs of male and female rotors to form the flanks of the male rotor as generated surfaces, which in cross section are defined by curves generated respectively by the points of intersection of the sides of the grooves of the female rotor with the pitch circle thereof, and to form the sides of the grooves in the female rotor as generated surfaces the sections of which are curves generated by the apex or crest points of the lands of the male rotor. An example of such construction is shown in the U. S. Patent No. 2,287,716, granted to Joseph E. Whitfield. While generated lands and grooves provide adequate continuity of sealing line, they are also subject to definite deficiencies, of which perhaps the most important are (1) length of sealing line due to the fact that with such contours the sealing line extends axially along a sharply oblique line from the crests to the bases of the lands, rather than at right angles to the axes of the rotors, (2) the unavoidable formation of spaces between walls of a groove and the flanks of its cooperating land, which spaces are crescent shaped in cross section and create undesirable trapped pockets varying in volume as the rotors revolve, and (3) the inability to employ to the most advantageous extent a construction in which the major portion of the sealing or clearance line between the rotors and the casing and between the intermeshing portions of the rotors is determined by the proximity between a narrow edge and a relatively moving surface rather than between two relatively moving surfaces. In order to decrease the loss due to leakage, by shortening the length of the sealing line between the rotors as compared with a fully generated profile, Lysholm proposed an asymmetric profile in which the leading flank of the male land is substantially circular and the trailing flank is generated. That profile, while accomplishing that purpose, still is productive of the spaces creating the undesirable trapped pockets characteristic of the fully generated profile.

The primary consideration, heretofore, in the development of rotor profiles for apparatus of the kind under consideration has been to produce profiles operative to give continuous or uninterrupted sealing lines between the rotors, on the theory that the provision of a sealing line of uninterrupted extent and of substantially uniform clearance of minimum practical value is paramount to other considerations if highest efficiency of operation is to be obtained.

I have discovered, however, that this is not the case and it is the general object of my invention to improve the performance of devices of the kind described by the provision of rotors having a novel form of profile, and by optionally providing additional features made possible only by virtue of the new profile, which will operate not only to eliminate the deficiencies inherent in the structures heretofore proposed but will also provide new and positive advantages by subordinating continuity of sealing line of uniform clearance to the other gains to be made.

The manner in which the general and more detailed objects of the invention which will hereinafter be pointed out are achieved, together with the advantages to be derived from use of the invention, will best be understood from consideration of the ensuing portion of this specification, taken in conjunction with the accompanying drawings, in which.

Figure 1:
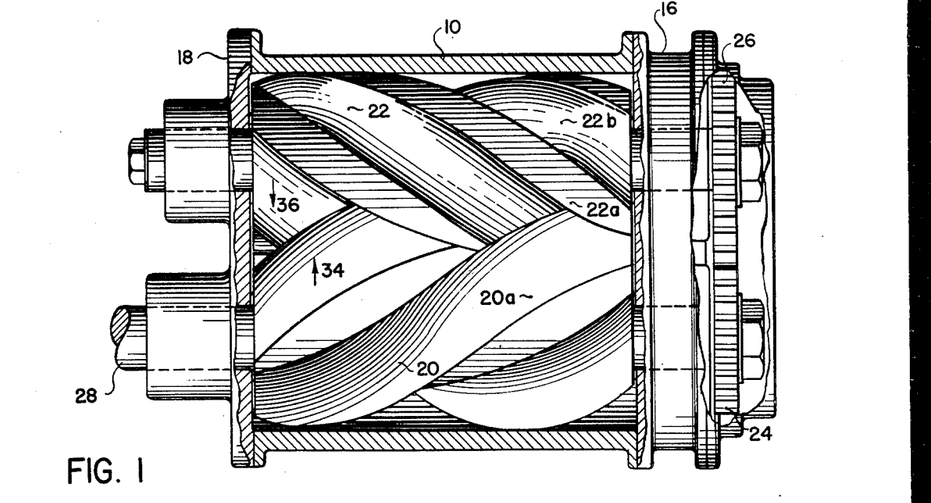
Fig. 1 is a plan view partly in section, of a device embodying the invention, certain sealing details being omitted for clarity of illustration.
Figure 2:
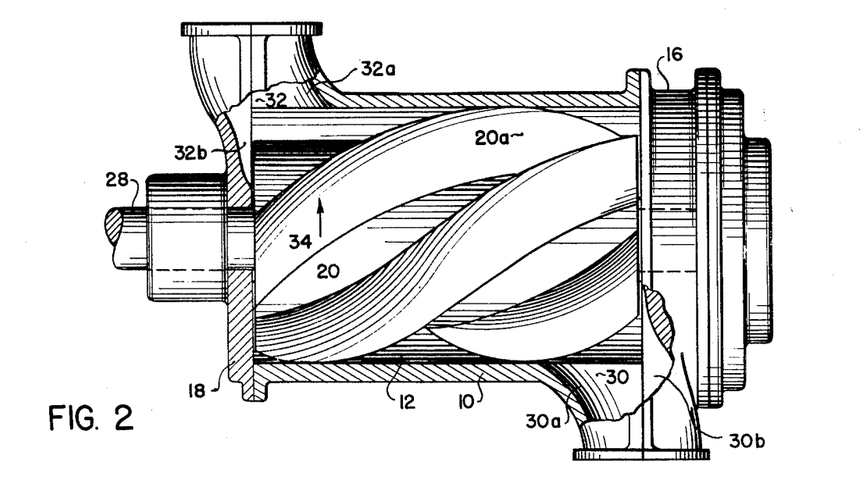
Fig. 2 is an elevation, partly in section, of the device shown in Fig. 1.
Figure 3:
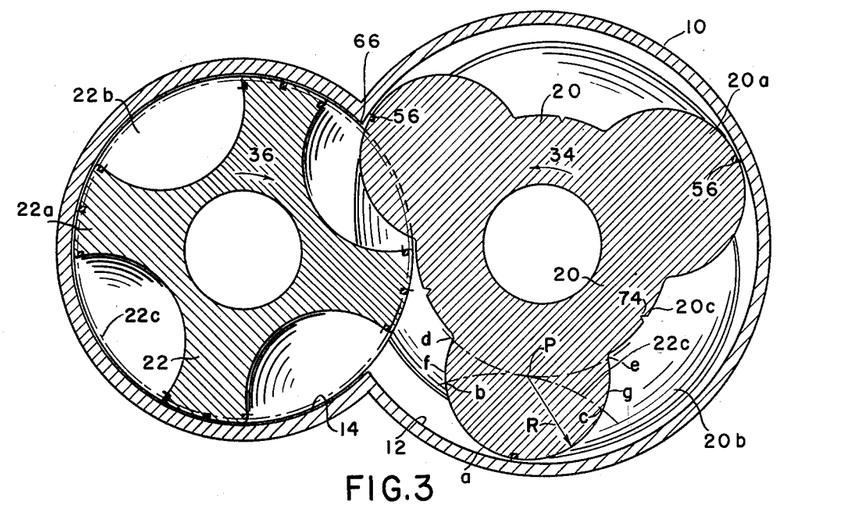
Fig. 3 is a transverse section of the device shown in Fig. 1, showing rotor sealing strips optionally usable.

Referring now to the drawings, Figs. 1 to 3 show, by way of example but without limitation, one form of apparatus embodying the invention, which will be described in operation as a compressor although it will be understood that devices of the kind to which the present invention is applicable may be operated equally well as compressors of elastic fluid or as elastic fluid motors, depending upon the direction of rotation of the rotors. The apparatus shown comprises a casing structure having a central section 10 providing two cylindrical, parallel and intersecting bores 12 and 14 for receiving the rotors, an end section 16 providing an inlet end closure and an end section 18 providing an outlet end closure. The end sections have suitable bearings for rotatably mounting the rotors 20 and 22 and the latter are maintained in proper phase relation to prevent rubbing contact by the timing gears 24 and 26. The device is driven through shaft 28 extending from rotor 20.

In the embodiment shown, the casing is formed to provide combined radial-axial inlet and outlet ports, the inlet port 30 having a portion 30a opening radially into the casing and a portion 30b opening through the end wall, while the outlet port 32 has similar radial and axial portions 32a and 32b respectively. Insofar as the present invention is concerned, the type of port, that is, axial, radial or combined, is not critical, nor is the specific port configuration and the specific port outlines therefor have not been indicated, since they may be of one of a number of well known kind.

The rotors 20 and 22 are of the male and female type, the male rotor having helical lands 20a forming between them grooves 20b and the female rotor 22 having helical lands 22a forming between them the grooves 22b. In the example shown, the male rotor has three lands and the female rotor has four, the male rotor lands having a greater helix angle than those of the female and the rotors being appropriately geared by the timing gears so that the male rotor turns at higher speed than the female. The relation between the number of lands and grooves in the different rotors may, however, vary widely, depending upon such considerations as desired compression ratio, pressure difference, etc. For the ideal theoretical condition of sealing between two rotors of the configuration shown the envelop of the female rotor coincides with its pitch circle, the grooves 22b lying wholly within the latter while the bottoms of the grooves 22b of the male rotor coincide with its pitch circle so that the lands 20a lie entirely outside the pitch circle. Such construction, however, results in the lands of the female groove having sharp edges at their crests and the grooves of the male rotor having sharp corners at the roots of the lands. This is not desirable from a practical standpoint and accordingly, in order to provide rounded corners for the edges of the female lands and fillets at the roots of the male lands, the envelop of the female rotor is ordinarily in practice made slightly greater or less in diameter than the pitch circle. The former is preferable and such construction has been shown in Fig. 3, the pitch circle of the rotors being indicated at 20c and 22c respectively. With the specific form of land and groove configuration shown, however, the extent of deviation from the pitch circle for the purpose of providing rounded corners and fillets is relatively limited in proportion to the depths of the grooves, if undesirable interruptions or blow holes are to be avoided.

The general mode of operation as a compressor of the type of device just described is well known. With the rotors turning in the directions indicated by arrows 34 and 36 the helical grooves are filled during the inlet or induction phase of the cycle as they pass the inlet port. The induction phase of the cycle may be followed by transportation phase during which the fluid is carried peripherally at constant volume after registry with the inlet port has terminated and before the compression phase commences. However, since a transportation phase per se performs no useful function, the design in most instances is advantageously such that compression commences as soon as the inlet closes, or even slightly before if a ramming effect is incorporated, so that there may be overlap between the induction and compression phases. The compression phase commences when the lands of one rotor enter the filled grooves of the other, the point of entry traveling axially as the rotors turn, due to the helical nature of the lands, to decrease the length and volume of the chambers as the rotors continue to turn. Compression continues until the grooves come into communication with the outlet port, to initiate the discharge phase of the cycle, which continues until the point of entry of a land into its cooperating groove has traveled to the discharge end of the groove and reduced its volume to zero. Obviously, when the device is operated as a motor, the above cycle is reversed, the motive fluid under pressure forcing the lands out of the grooves to lengthen and increase the volumes of the working chambers and to finally be discharged in its expanded state through the low pressure port which would in the case of a compressor be the inlet port.

In accordance with the principles of this invention the inlet, discharge and compression phases of the cycle are improved by the provision of a new form of profile for the rotor lands and grooves, operative to provide a shorter sealing line between rotors than heretofore obtained, to eliminate pockets of trapped fluid at the discharge ends of the grooves, which are productive of losses, and the creation of suction pockets of similar nature at the inlet end (also productive of losses), to enable improved flow of fluid to and from the working chambers to be obtained, and to provide a construction making possible the use, if desired, of sealing fins or edges to an extent heretofore impractical, so that the working chambers may be largely sealed by the proximity of cooperating edges and surfaces and the clearance between adjacent relatively moving surfaces made greater without loss of efficiency due to leakage than would otherwise be possible.

To this end, the lands and grooves of the rotors are preferably provided with symmetrical profiles, the outer or crest portions of the male lands being of circular section while the female grooves are of like circular section. For reasons hereinafter discussed, minor deviations from exact symmetrical circular profile may in some instances be desirable, but practical considerations limit the magnitude of such deviations to so small a value in relation to the size of the profiles that even when taking them into account the profiles may be said to be substantially symmetrical and substantially circular, which terms as hereinafter employed in the appended claims are intended to include such deviations.

In the embodiment shown in Fig. 3, the profile of the male lands is made in the form of an arc $a$ of radius R struck from point P lying at the point of intersection of the pitch circle of the rotor with a radius extending from the rotor axis and bisecting the section of the land. Arc $a$ extends from point $b$ to point $c$, these points lying at the places of intersection of the profile with the pitch circle 22c when the section of the land is fully meshed in the female groove. From points $b$ and $c$ to the roots $d$ and $e$, respectively, the portions $f$ and $g$ are generated curves, of epicyclic form, being generated respectively by the points of intersection of the curve of the female groove with the pitch circle of the female rotor. The deviation of the curves $f$ and $g$ from an arc of radius R is relatively very slight, so that the profile may be said to be substantially circular, and as will hereinafter be explained other deviations of minor extent may be made from the exact circular profile within the purview of the invention. The profile of the female groove is complementary to the arcuate outer portion of the male land.

Figure 4:
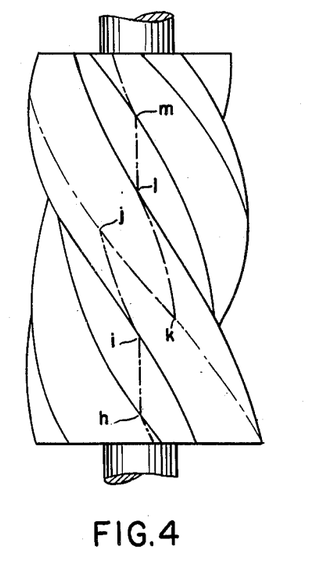
Fig. 4 is a diagrammatic view illustrative of the sealing line resulting from the use of rotors having lands with generated profiles.
Figure 5:
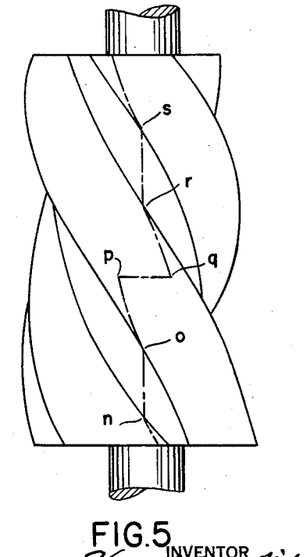
Fig. 5 is a similar view showing the sealing line obtained with rotors having the profiles of the present invention.

With the above configuration the length of the sealing line between the rotors is materially decreased as will be evident from a comparison of Figs. 4 and 5 in which are shown in developed form the course of the sealing lines between rotors having symmetrical generated profiles and rotors having profiles embodying the present invention. In these figures the male rotor is shown and the sealing lines indicated are those which would be made by a female rotor superimposed on the male rotor and meshing therewith. Referring to Fig. 4, showing a fully generated profile, the sealing line comprises a portion $h$—$i$ extending parallel with the rotor axes and formed between the cylindrical crest of the female land and the cylindrical bottom of the male groove; a portion $i$—$j$ extending angularly along one flank of the male land from root to crest; a portion $j$—$k$ extending along the crest or apex of the male land; a portion $k$—$l$ extending angularly from the crest of the male land to its root along the second flank of the land; and a portion $l$—$m$ similar to portion $h$—$i$ formed between the bottom of the succeeding male groove and the crest of its cooperating female land. Fig. 5 shows the sealing line obtained with the profile of this invention, comprising the portion $n$—$o$ at the base of the male groove; the portion $o$—$p$ following the generated base portion of one male flank, for example the portion $f$ of the profile shown in Fig. 3; the portion $p$—$q$ following the arcuate portion $a$ of the male profile and extending at right angles to the rotor axes; the portion $q$—$r$ following the generated curve portion $g$ of the male profile; and the portion $r$—$s$ at the base of the succeeding male groove. It is apparent from mere inspection that with the new profile the length of the sealing line is very materially reduced and while the sealing line between rotors is only a part of the total sealing line, the remainder being formed by the sealing line between the crests of the rotor lands and the rotor ends on the one hand and the casing on the other, the decrease in the length of the whole sealing line amounts to some 12% in a normal design, as compared with the line obtained with fully generated profiles.

Together with the improvement due to a shortened sealing line, other and even more important advantages accrue from use of the invention. One of these is the elimination of the trapped fluid pockets at the ends of the grooves, which pockets are characteristics of profiles having a fully generated flank and which are created from zero volume at the inlet end and run out to zero volume at the outlet end as the rotors turn. Such pockets require venting at the outlet end of the groove if inadmissibly high pressures are to be avoided, and also create undesirable vacuum pockets at the inlet unless special channels to admit fluid to them are provided. Various ways of doing this have been proposed in the prior art, as for example the means shown in Lysholm Patents No. 2,243,874 and No. 2,289,371, and Whitfield Patent No. 2,287,716. Such means, however, all involve a certain amount of loss, and even if vented, the pockets produce unbalanced forces productive of torque tending to make the rotors run out of phase and throwing additional stress on the timing gears to hold them in phase. This may best be illustrated by reference to Figs. 6(a) to 8(c), showing for purposes of comparison the action taking place with different forms of rotor profiles. In the several figures the sections are taken looking from the outlet ends of the grooves toward the inlet ends and in Fig. 6(a) there is indicated at 38 the trapped pocket formed ahead of the leading flank of the male land in a device having generated profiles, as the apex 40 of the land enters the female groove. As the rotors continue to turn in the direction of arrows 34 and 36, the volume of pocket 38 is steadily decreased as will be seen by reference to Figs. 6(b) and 6(c), since the apex 40 follows the curve of the female groove to close the pocket at one side while the crest point 42 on the female rotor follows the flank of the male land to close the opposite side of the pocket. At one end the pocket is closed by the sealing line extending along the flank of the male rotor (below the plane of the paper) and at its other end the pocket is closed by the casing end wall (assumed to be in the plane of the paper). In the position shown in full lines in Fig. 6(a) the resultant force from the pressure of the fluid trapped in the pocket is represented by the vector 44, passing through the axis 46 of the female rotor and in this position no torque on the latter is exerted by the fluid trapped in the pocket. As soon as the rotors turn further, however, for example to the position shown in dotted lines, the resultant force vector swings to the position 44' to produce torque tending to make the female rotor lead the male rotor. This torque increases as the rotors turn, due to the increasing moment arm through which the resultant force vector acts. By the time the rotors are fully meshed as shown in Fig. 6(b) the pocket has been greatly reduced in volume as indicated at 38, with both resultant increase in pressure within the pocket, unless vented, and further increase in the length of the moment arm between the force vector and the rotor axis. As the rotors continue to turn from the position of Fig. 6(b) to Fig. 6(c) the pocket is evidently run out to zero volume as the points 40 and 42 approach each other, each continuing to follow the profile of the other rotor. While this is taking place a second opening 48 is opened up between the trailing flank of the male land and the wall of the groove, which opening increases in sectional area as the rotors turn. However, due to the helix angle of the lands and grooves, this opening does not represent a trapped volume but on the other hand opens up a passage back to the inlet end of the device and must consequently be closed by the outlet end wall or an equivalent closure if blow back to the inlet is to be avoided.

Figure 6A:
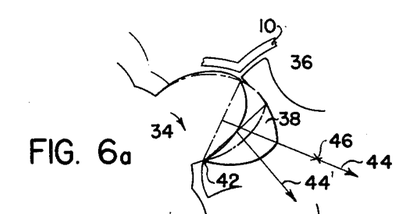
Figs. 6(a) to 6(c) are diagrams illustrative of the production of trapped pockets resulting from use of generated profiles.
Figure 7A:
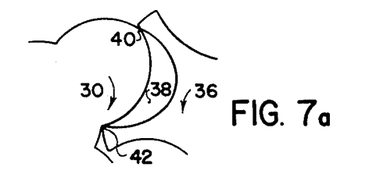
Figs. 7(a) to 7(c) are similar diagrams illustrative of similar pockets resulting from use of asymmetric profiles.
Figure 7B:
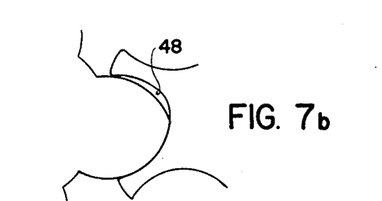
Figure 7C:
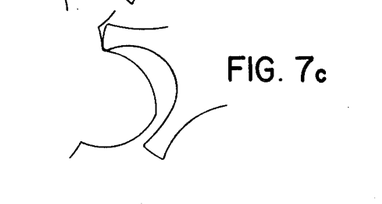

In the case of an asymmetric profile having a generated flank the result is very similar, as will be seen by reference to Figs. 7(a) to 7(c). As in the case previously discussed the trapped pocket 38 is formed as soon as the apex 40 of the male land enters the female groove and this pocket is run out to zero volume by the time the rotors are fully meshed, as shown at Fig. 7(b) due to the arcuate nature of the leading flank of the male land. Likewise, the opening 48 on the trailing side of the male land is opened up, leading back to the inlet. In this case also the trapped pocket must be vented to avoid excessive pressures and even if vented any pressure existing in it exerts an undesirable torque on the female rotor for the same reasons as explained with reference to Figs. 6(a) to 6(c). If the pocket is vented to the inlet it represents a volumetric loss and if vented to the outlet it must obviously be brought up to discharge pressure.

Figure 8A:
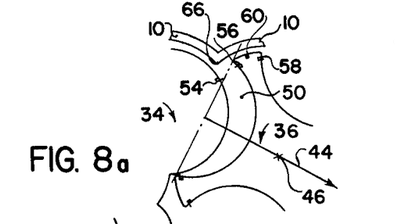
Figs. 8(a) to 8(c) are similar diagrams illustrative of the elimination of such pockets by the present invention.
Figure 8B:
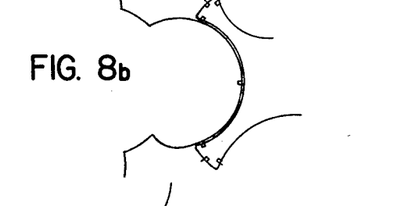
Figure 8C:
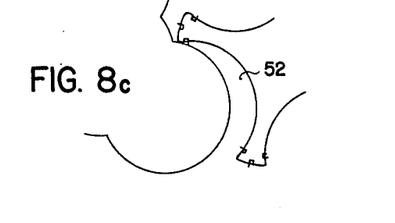

The manner in which the undesirable trapped pockets are avoided by the present invention is shown in Figs. 8(a) to 8(c). Due to the fact that the outer or crest portion of the male profile is not generated, it does not meet the edge of the female groove as the apex of the male land enters the groove, as will be seen from Fig. 8(a). Instead, the apex of the male land does not come into sealing proximity to the wall of the groove until after it has passed into the groove to a position well within the pitch circle of the female rotor. In effect, the land rolls into the groove to provide a space 50 in the form of an open channel which remains in free communication with the main compression chamber, formed between the rotors and the casing, until the rotors are fully meshed and the space 50 is run out to zero volume as shown in Fig. 8(b). Since the female groove is symmetrical and open the resultant force due to the compressed fluid in the groove acts in all positions of the rotor between that shown in Fig. 8(a) and that shown in Fig. 8(b) radially along vector 44 passing through the rotor axis 46 and thus produces no torque on the rotor. On the trailing side of the male land a channel-like opening 52 is opened up as soon as the land passes the fully meshed position, as will be seen from Fig. 8(c).

Thus, with the present form of construction, losses and undesirable torque due to trapped volumes are eliminated and as one result of this, higher rotor speeds may be employed with consequent improved performance. The elimination of the trapped pockets is particularly advantageous in designs where relatively high compression ratios are desired, for as the compression ratio is increased the volume of each compression space at the time of discharge becomes smaller and the trapped volume becomes an increasingly large percentage of the total quantity of fluid subjected to compression. Thus for high compression ratios, trapped pockets become increasingly detrimental to efficient operation.

Figure 9:
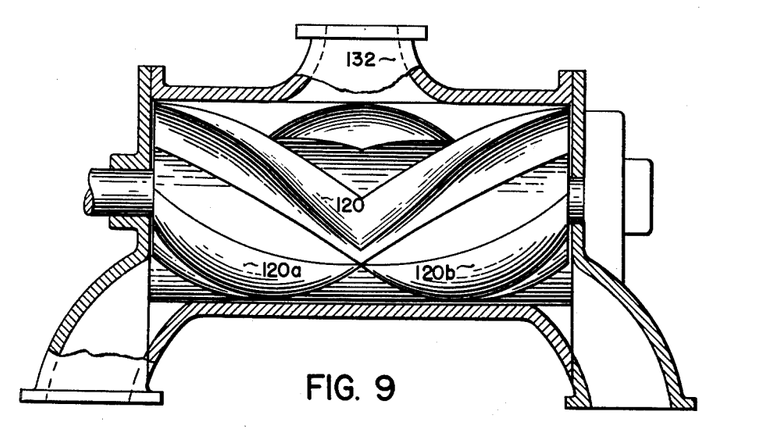
Fig. 9 is a view similar to Fig. 2, showing the application of the present invention to a device having "herringbone" rotors.

Another advantage flowing from the elimination of trapped pockets is the fact that if desired herring-bone rotors may be employed without disadvantage and in Fig. 9 there is shown by way of example such a construction. The arrangement illustrated is in general organization like the device previously described except that in the present instance the casing structure provides two inlet ports at opposite ends of the casing and a centrally located outlet port 132. The rotors, of which the male rotor 120 appears in the figure, are of the profile previously described but are each divided into two portions to provide two sets of lands and grooves of opposite helix angle on each rotor, such as indicated at 120a and 120b on the male rotor shown. In this case the outlet port opens wholly radially into the compression chambers, and the outlet ends of the grooves are located intermediate the lengths of the rotors and are not closed by a casing end wall. Instead, the compression spaces formed in each of the two portions of the rotors communicate with each other and with the common discharge port, these spaces being run out to zero volume against each other as the rotors turn. In this arrangement, the fluid being compressed in a chamber diminishing in length axially in one direction toward the center of the device, is opposed by the fluid being compressed in the confronting chamber with which it is in communication and which is diminishing in length in the opposite direction toward the center. Thus the fluid in each of two confronting chambers acts as an end wall for the fluid in the other of the chambers and compression takes place in essentially the same way as if a casing end wall were interposed between the ends of the sets of grooves of opposite helix angle. Were it not for the new form of profile characteristic of this invention, trapped pockets of the kind described in Lysholm Patent No. 2,289,371 would be formed, which would have to be vented to the inlet side, as explained in that patent. As it is, all of the fluid compressed, both in the main compression chambers and in the channels formed between the approaching flanks of the lands and grooves, is discharged freely and smoothly to the outlet, and without appreciable loss of work done.

Still another advantage flowing from the present invention is that it enables larger clearances to be employed between the relatively moving adjacent surfaces of the rotors and casing, without corresponding increase in leakage losses, than is possible with prior forms of this type of device. As is well known, it is a highly desirable desideratum in devices of the kind under consideration to make the clearances between the relatively moving parts as small as possible, but with the high operational speeds characteristic of such devices having acceptable efficiency, which may involve male rotor tip speeds of the order of as high as 150–200 meters per second, the reduction of the clearance to zero value, so that rubbing occurs between rotor surfaces or between rotor and casing surfaces, usually results in serious damage to if not destruction of the apparatus in a short time. Practical considerations, such as unequal expansion under the influence of the heat of compression, lateral and torsional deflection of the rotors, exact adjustment and timing of the rotors, as well as the ability to maintain very close tolerances of accuracy of manufacture on a commercial basis of the helix angles and profiles of the helical lands and grooves, make it necessary with apparatus as heretofore developed and in which sealing lines require to a considerable extent the coaction of relatively moving surfaces, to provide a designed clearance appreciably greater than the optimum in order to insure against rubbing under the conditions met with in practical manufacture and operation.

The desirability of employing thin edges projecting from the rotors and capable of wearing off without damage should they rub against a cooperating surface have heretofore been recognized. For example, circular fins projecting from the ends of the rotors on a radius lying between the bottoms of the grooves and the rotor shafts and intended to cooperate with the end walls of the casing have been proposed. Also, such fins or edges have been suggested for projection radially from female land crests to cooperate with the wall of the casing bore or barrel. However, with the profiles previously proposed, the use of projecting edges or fins to provide a sealing line between an edge and a surface, both within the grooves of the intermeshing rotors and between the crests of the rotors and the casing walls, has not been feasible for the reason that if so employed with such profiles the projecting edges or strips would interfere with one another at one place which would advance along the length of the projecting edges or strips as the rotors turn. With the present form of profile this interference is avoided, due to the fact that the crest line of the male land, from which a radially extending edge for cooperation with the casing wall may project, and the line at pitch circle radius along the wall of the female groove which the male land enters and from which a peripherally extending edge may project for cooperation with the flank (or a portion thereof) of the male land, do not meet or interfere in any plane normal to the axes of rotation of the rotors.

Instead, at any given section, the crest line of the male rotor crosses the pitch circle of the female rotor while still substantially peripherally spaced from the approaching wall of the groove of the female rotor being entered, and subsequently rolls into the female groove so as to come into sealing relation (closest proximity to) the wall of the groove at a place inside the pitch circle of the female rotor.

Figure 6B:
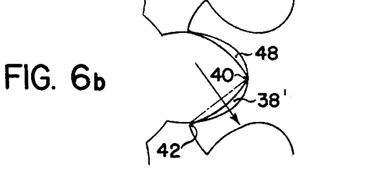
Figure 6C:
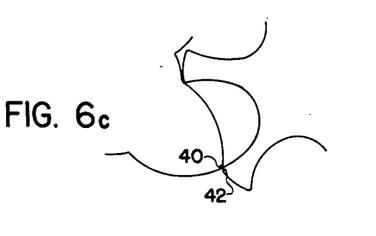

This may readily be appreciated by comparison of Fig. 8(a) with Fig. 6(a), in which sections of the casing 10 have been shown with exaggerated clearance for clarity of illustration. In Fig. 8(a) the male rotor is shown provided with a sealing strip 54 of the kind commonly employed in turbine practice, i. e. a thin metal fin, extending longitudinally of the land and projecting radially from the crest line of the land. A second strip 56 is shown extending peripherally from the leading edge portion of the crest of the female land, preferably just on the pitch circle, and a similar strip 58 is shown at the pitch circle of the trailing edge of the female land crest. As will be seen from Fig. 8(a) the strip 54, which ideally bridges substantially all of the clearance between the crest of the male rotor and the barrel of casing 10, and the strip 56, which ideally bridges substantially all of the clearance between the rotors, project toward each other in the position of the rotors shown in the figure, but due to the nature of the profiles they are peripherally spaced with the rotors in this position so that the strip 54 can pass freely into the groove without interfering with the projecting strip 56. This would not be possible with a profile having a generated flank as will be apparent from a consideration of Fig. 6(a), from which it will be evident that if a strip such as strip 54 projected radially from the crest line of the male land and a strip such as strip 56 projected peripherally from the female crest, at or near the pitch circle, the two strips would interfere at the point where the strip 54 crosses the female pitch circle and since the point of interference travels the length of the lands as the rotors turn, the entire length of the strips would be bent or destroyed by such interference. The utility of the sealing strip 54 on the male rotor is to provide the closest possible seal between the male land and the casing wall while that of the strips 56 and 58 is to afford the best possible seal along the root portions of the male flank, i. e. the profile portions $f$ and $g$ shown in Fig. 3 and particularly at the pitch circle in cases where the bottom cylindrical portion of the male groove lies slightly within the pitch circle to enable the bottom edges of the groove to be filleted. For sealing between the crests of the female lands and the casing, strips 60 extending longitudinally of these crests and projecting radially therefrom may be employed to advantage.

The profile characteristic of the invention provides a further distinct advantage, when combined with suitably arranged inlet and outlet passages, operative to improve the flow of liquid to and from the working chambers and to reduce dynamic losses. This may best be understood from a consideration of Fig. 10 in which the action is illustrated with reference to an outlet or discharge port in the case of a compressor. As shown in this figure, the casing 10 is provided with an outlet port 32 communicating with an outlet passage 62 leading from the port in a direction generally tangential with respect to the addendum portion of the male rotor, as indicated by the construction line 64. With the rotors turning in the direction of arrows 34 and 36, it will be evident from the figure that as each male land 20a approaches and passes the port edge 32c the characteristically rounded profile of the trailing side of the land forms between itself and the wall of the casing a smoothly contoured discharge opening 32d of diffusor-like form which opens gradually rather than abruptly for flow of fluid from the groove 20b to the outlet passage 62, which likewise is preferably of diffusor form from the throat portion 62a. Not only are dynamic losses reduced as compared with an abruptly opening port of the usual present type, but the noise level of the discharge produced by the usual abrupt opening is materially reduced. While the flow of fluid from the female groove 22b to the passage 62 is not as direct as that from the male grooves 20b, this is of minor importance, since owing to the greater volume and peripheral speed of the male grooves the fluid discharged from the latter ordinarily has from 70 to 80% of the total kinetic energy of the fluid discharged, although this percentage may vary with individual designs.

The hereinbefore discussed advantages, and the further advantage of a reversible device due to the use of a symmetrical rather than an asymmetrical profile, are gained by subordinating to these advantages, as previously noted, the factor of continuity of sealing line of uniform clearance, heretofore considered of primary and controlling importance. In the present case the latter factor, which I have found to be of secondary importance, is disregarded in favor of profiles which gain numerous more important advantages by employing a contour which gives a sealing line for the compression chambers which includes a small section where the sealing clearance or sealing line is not of continuous uniform width but is interrupted by a short section resulting in a very slight opening in the form of a very flat and obtuse and substantially isosceles triangle. As will be remembered from the discussion of Fig. 5, the sealing line between the intermeshing lands and grooves is continuous as is also, like in previous constructions, the sealing line or clearance between the ends of the rotor and the end wall of the casing. Also the sealing line between the rotor crests and the cylindrical walls of the casing barrels is the same as heretofore. However, in the present case, the crest 40 of the male rotor reaches the line 66 of intersection between the male and female casing bores or barrels 12 and 14, axially displaced ahead of or toward the outlet end of the grooves (in a compressor) as compared with the leading edge of the crest of the cooperating female land defining the other side of the compression space.

Figure 11:
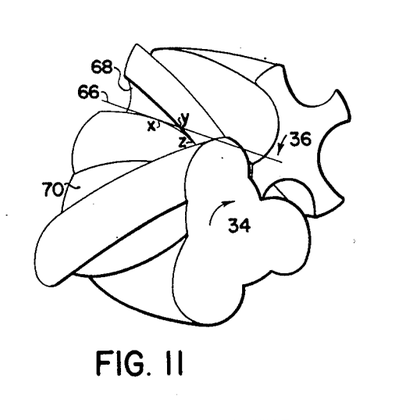
Fig. 11 is a perspective view of rotors embodying the invention.

This will be seen from the sections shown in Figs. 3 and 8(a) and the nature of this interruption is best shown in Fig. 11, in which the line of intersection of the cylinder barrels is shown at 66. In the embodiment shown, the line 66 is substantially on the pitch circle of the female rotor, since the envelop of the female rotor is very close to the pitch circle. The intersection of the crest of the male rotor with this line at the position of the rotors shown is indicated at $x$ while the leading edge of the female crest intersects this line at $y$, axially displaced from $x$. At a place radially inside the pitch circle of the female rotor, (see also Figs. 8(a) and 8(b)), the crest of the male land comes into sealing proximity with the wall of the female groove, so that the interruption in the uniform sealing line is represented by the flat and generally isosceles triangle $x$—$y$—$z$. As will be evident from the figure, the area of the interruption is relatively minor and by way of illustration the following data will serve to show the small effect this interruption has on the overall performance of the device. In the example shown, the combination of lands is three for the male and four for the female. If we assume the male rotor to be approximately 150 mm. outside diameter and approximately 300 mm. long, with an average clearance between rotors and between rotors and casing of 0.15 mm., the total length of the sealing line (at its maximum length) is approximately 1532 mm. with a total leakage area of approximately 252 sq. mm. With such a design and with the male profile exactly circular on an arc struck from a center on the male pitch circle the effective area of the interruption (area $x$—$y$—$z$) is only about 22 sq. mm. or about 8.7% of the total leakage area.

In this connection, it is to be pointed out that the area $x$—$y$—$z$ is effective as an interruption in the sealing line only during that part of the compression phase of the cycle prior to registration of the compression space with the outlet port. The area $x$—$y$—$z$ travels axially as the rotors turn and ceases to be a part of the sealing line as soon as it passes the edge of the outlet port, which is before the compression space is run out to zero volume during the delivery phase of the cycle. Thus this area acts as a leakage opening only during a portion of the time when fluid under pressure is being compressed and delivered under pressure from the compression space.

As has previously been brought out, the improved new profile operates to shorten the leakage line and therefore decrease the leakage area by an amount of the order of some 12%, so it is apparent from the standpoint of leakage area alone the shortening of the length of the sealing (or leakage) line more than compensates for the interruption introduced in the line.

In this connection it is important to note that the interruption in the sealing line does not open up a blow hole or opening leading back to the inlet, but leads back only to the groove forming a part of the next succeeding compression chamber in which a confined volume of fluid is either being transported at constant volume or is being compressed. As will be seen from Fig. 11 any fluid leaking through the opening represented by the interruption $x$—$y$—$z$ flows only from the compression space 68 to the groove 70 which has passed out of registry with the inlet port and is closed at its discharge end by the casing end wall and at its inlet end either by the inlet end wall or the cooperating land of the female rotor in case compression has already commenced in this groove, as is the case with the rotors shown in the figure. Consequently the pressure difference across the leakage opening is only that existing between two adjacent working chambers and is therefore in most cases relatively small, so that the leakage flow back from chamber to chamber through this opening is of relatively very minor importance. Also, due to the higher speed of operation made possible by the advantageous features of the profile, the amount of leakage through the interruption is smaller, percentagewise, than would otherwise be the case. Against this, taking into account the shortened length of the sealing line, the other advantages enumerated are pure gain.

Figure 12:
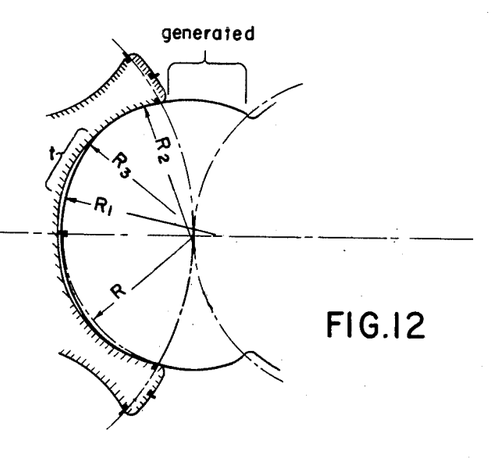

From the standpoint of the elimination of trapped pockets, only the profile in which the outer portion of the male profile is a true circle struck from a center on the pitch circle, cooperating with a complementary truly circular female groove, will wholly obviate such pockets. However, in the type of device under consideration, a certain amount of leakage through the normal clearance space will take place from any such pocket. Therefore, pockets of such small volume that they can vent themselves through normal leakage without undue pressure rise as they run out to zero volume can be tolerated if advantage can be gained by slight deviation from the exact circular profile. In some instances deviation may be advantageous, since by certain deviations the area of the interruption $x-y-z$ in the sealing line may be reduced at the expense of only the formation of a pocket so small as to be negligible because of being self venting through the normal clearance. One such deviation is shown in Fig. 12. In this form the male profile is made somewhat "fatter" than the exactly circular outline by utilizing the radii $R_1$, $R_2$ and $R_3$ from the centers indicated, the relation of the resultant curve being indicated by the dotted line arc of radius R. This fatter profile requires that the female groove be relieved slightly over the distances $t$ in order for the male land to clear the groove, thus producing a very small trapped volume which can vent themselves through normal clearance. In the figure the deviation from the truly circular profile and the size of the pockets is somewhat exaggerated for clarity of illustration. In practice, the deviation required to reduce the area of the interruption $x-y-z$, as compared with its area when true circular profile is used, by a substantial percentage, is relatively very small dimensionally as compared with the height of the land. It is to be remembered, however, that even the maximum size of the interruption $x-y-z$, produced with a truly circular profile, is only a small fraction of the total leakage area, so that reduction of the area of the interruption by deviating from the true circular profile does not reduce the total leakage area, percentagewise, by more than a few percent. Usually, the maximum deviation advantageously employable will be not over three or four percent of the height of the land which consequently still retains its substantially circular profile.

Figures 10, 13:
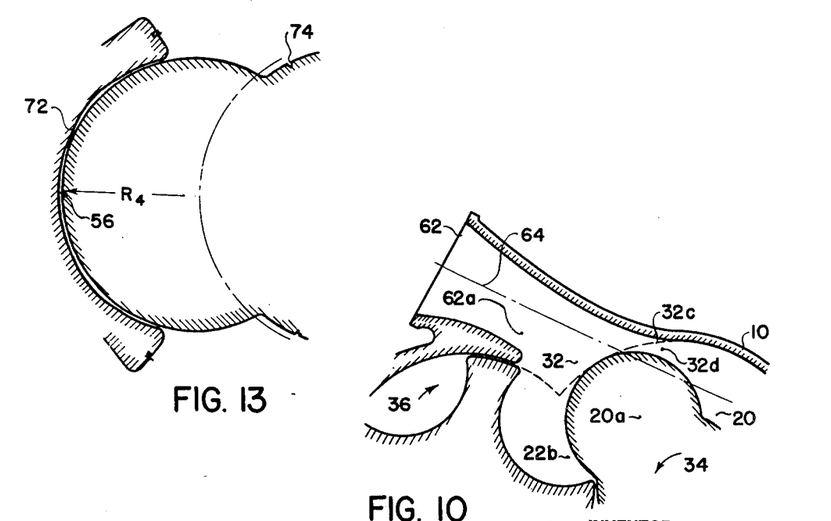
Fig. 10 is a transverse sectional view illustrative of certain porting advantages obtainable with the invention.
Figs. 12 to 14 are sectional views illustrative of certain variations of the basic profile shown in Fig. 3.

Another form of deviation operative to reduce the size of the interruption is shown in Fig. 13, in which the crest of the male profile is struck on an arc of radius $R_4$ from a center lying outside the pitch circle of the rotor. This again necessitates relieving the female groove and produces small self venting pockets.

In general it may be said that deviations such as above-described operate to reduce the size of the interruption and to produce trapped pockets, the magnitude of the reduction in leakage area and the size of the pockets both increasing with the amount of deviation. Consequently, whether any deviation is employed, or the extent of it if used, will depend on individual requirements in specific cases. In all cases however, the deviation, if used, is so slight as to result in a profile that is still substantially circular.

In the deviations shown in Figs. 12 and 13, the primary object is to reduce the size of the interruption in the sealing or leakage line, and from this standpoint the most important factor is with reference to sealing on the pressure side of the land. Because of this it is possible in some instances, if desired, to confine the deviation from the truly circular based on a center on the pitch circle of the rotor, to one side of the profile, as for example in the case of a profile such as that shown in Fig. 12, to make one side of the land to profile of radius R and the other to the profile resulting from radii $R_1$, $R_2$, $R_3$. Even in such case the profile is substantially symmetrical and ordinarily any benefit to be derived from such a variation is not as a practical matter sufficient to warrant deviation from the simpler forms of profile.

Figure 14:
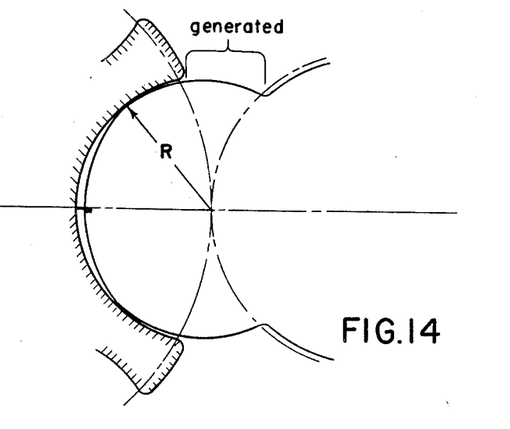

Reasons other than reduction of the area of the interruption in the sealing line may make slight deviation from the truly circular profile advantageous. For example, if a sealing strip 54 is used on the crest of the male land, its most important function is to substantially close the clearance between the crest of the rotor and the wall of the casing. With a different number of lands on the male and female rotors any given land on the male rotor will during successive revolutions enter different grooves of the female rotor, and should one or more of such grooves be relatively shallow, due to variations within manufacturing tolerances, the reduced clearance might be such as to wear off the sealing strip to an extent such that it does not close the clearance between the rotor and the casing to the desired extent. In order therefore to compensate for such practical variations in clearance the crest of the male rotor may be slightly flattened as shown in Fig. 14 to make certain that the extent to which the sealing strip is worn down is determined by lack of clearance between the strip and the casing and not by the lack of clearance between the strip and any one particular groove in the female rotor. This may result in a slightly greater clearance 72 across the central portion of line $p-q$ (Fig. 5) than would otherwise be the case, but the length of this distance of greater clearance is much less than the length of the line between the rotor crest and the casing, so that the latter is controlling. Likewise, the maintenance of a close seal between the crests of the female lands and the casing along their whole lengths, is more important than a close seal between them and the bottom of the male grooves along lines $n-o$ and $r-s$ (Fig. 5) which are relatively short. To this end the bottoms of the male grooves may advantageously in some cases be provided with longitudinally extending narrow slots 74 into which the strips 60 may roll without being worn in case the clearance between the crests of the female lands and the bottoms of the male grooves is less than the clearance between the female rotor and the wall of the casing.

In the several embodiments thus far described the lands and grooves of the rotors have been formed so that the crests of the female lands and the bottoms of the male grooves are either on the respective pitch circles, so that there is rolling contact between these surfaces, both of which are convex, at the bottoms of the male grooves, or these surfaces are displaced from the pitch circles, in order to permit the use of rounded and filleted corners respectively, by so small an amount that the action between cooperating convex surfaces is essentially the same.

In order to meet the requirements of some cases, however, particularly where the ratio of capacity to weight is important it may be desirable to provide rotors of which the female rotor is formed with lands and grooves having addendum portions and the male rotor is formed with lands and grooves having corresponding dedendum portions of such magnitude as to make impractical the use of profiles in which the crests of the female lands and the bottoms of the male grooves are both convex.

The principles of the present invention may however be applied, and its advantages secured, in constructions of the kind noted above in which the female lands may have substantial addendum portions and the male grooves correspondingly substantial dedendum portions, and in Figs. 15-18, there is illustrated by way of example one form of such construction, together with the nature of the sealing line between the rotors obtained therewith.

In the embodiment illustrated in Figs. 15 to 18 the device comprises a male rotor 20 having four lands and grooves and a female rotor 22, having six lands and grooves, the rotors being housed in the casing 10 in the manner hereinbefore described.

The profile of the addendum portion of the male rotor lands is shown as formed essentially in the same manner as that illustrated in Fig. 3, the outer circular portion $a$ of the profile extending between points $b$ and $c$, being struck on radius R from point P lying on the pitch circle of the rotor. The inner flank portions $f$ and $g$ of the profile, extending respectively between points $b$ and $d$ and points $c$ and $e$, are generated curves, being generated by the point of intersection of the curve of the female groove with the pitch circle of the female rotor.

The dedendum or root portions of the male land profiles are in the form of arcs $a'$ of radius R' struck from center P' lying on the pitch circle of the rotor.

The profile of the dedendum portion of the female groove is formed by arc $a''$ extending from points $b''$ and $c''$ lying on the pitch circle of the rotor, and the addendum portion of the groove is substantially formed by arc $a'''$ struck on the radius R'' from center P'' lying on the pitch circle of the rotor.

If clearance be neglected, the arcs $a$ and $a''$ will be of the same radius and the desired clearance is obtained by providing such difference in radius as may be required. Likewise arcs $a'$ and $a'''$ will be of the same radius if no clearance were provided. Clearance is in all instances desirable, and accordingly the radius of these arcs is made different.

For a condition of no clearance, the theoretically exact profile of the addendum portion of a female land should be of the same configuration as the addendum portion of the male land, with the roots of the addendum portion of the female profile being generated. Thus for a theoretically exact profile giving a continuous sealing line with no clearance the generated portions $f'$ and $g'$ of the profile extending between points $c''$ and $c'$ and points $b''$ and $b'$ respectively are generated curves, being generated by the point of intersection of the curve of the male land with the pitch circle of the male rotor, whereas the arc $a'''$ forming the major portion of the addendum should extend between the points $b'$ and $c'$. This is illustrated on enlarged scale in Fig. 16(a) and as will be evident from the drawings, the extent and deviation of the curves $f'$ and $g'$ from circular arcs is so slight that in practice, and taking into consideration the clearances actually employed, this deviation can ordinarily be neglected and the addendum portions of the female lands be made of arcuate section. In this connection, however, it is to be noted that if the addendum portion of the female lands is increased relative to the dedendum portion as compared with the proportions shown in the drawings, the extent of the surfaces $f'$ and $g'$ may be increased, and it may be advantageous to make them of generated form to avoid opening up undesirably large clearance.

In the embodiment described, sealing edges similar to those shown in Fig. 3 are employed, these edges comprising the sealing strip 54 projecting radially from the crest line of the male rotor land and the female rotor land being provided with the peripherally projecting sealing strips 56 and 58 located at the pitch circle and the radially projecting sealing strip 60 at the crest of the land.

Figure 17:
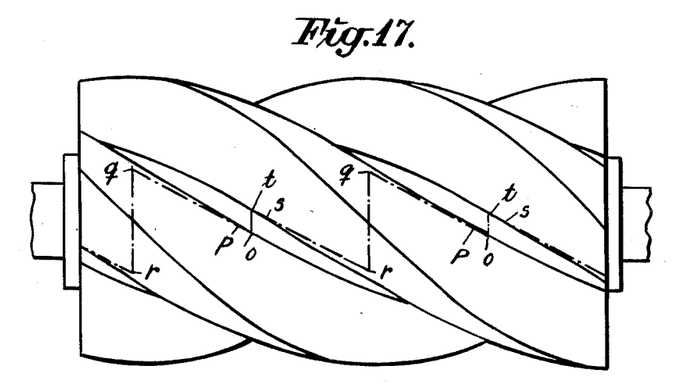
Figs. 17 and 18 are views similar to Fig. 5 showing the nature of the sealing line obtained between the rotors.

Also, in the embodiment shown, the crest of the male land is slightly flattened by forming it as an arc of radius $R_1$ of greater radius than radius R. Likewise the crests of the female lands are shown as slightly flattened in the region of the sealing strip 60. In these cases, however, as in the embodiments previously described, the deviation from true circular form is relatively little, the contours remaining substantially circular. Referring now more particularly to Figs. 17 and 18 the sealing line obtained with the above described construction is illustrated in the manner similar to that shown in Fig. 5. Considering first the male rotor shown in Fig. 17, the sealing line over the addendum portion of the male land comprises the portion $o$—$p$ following the line of juncture between the arcuate surface $a'$ and the generated male land portion $f$, or in other words, a cylindrical surface determined by the pitch circle of the male rotor; the portion $p$—$q$ obliquely following the generated surface $f$ of the flank of the land; the portion $p$—$r$ extending at right angles to the axis of rotation of the rotor and following the arcuate portion $a$ of the profile, as indicated; the portion $r$—$s$ obliquely following the generated surface $g$; and the portion $s$—$t$ following the line of intersection between the arcuate surface $a'$ and the generated portion $g$. The sealing line over the dedendum portion provided by the arcuate surface $a'$ is constituted by the portion $t$—$o$ of the sealing line and like the portion $q$—$r$ this portion $t$—$o$ is at right angles to the axis of rotation.

Figures 15, 16, 16A:
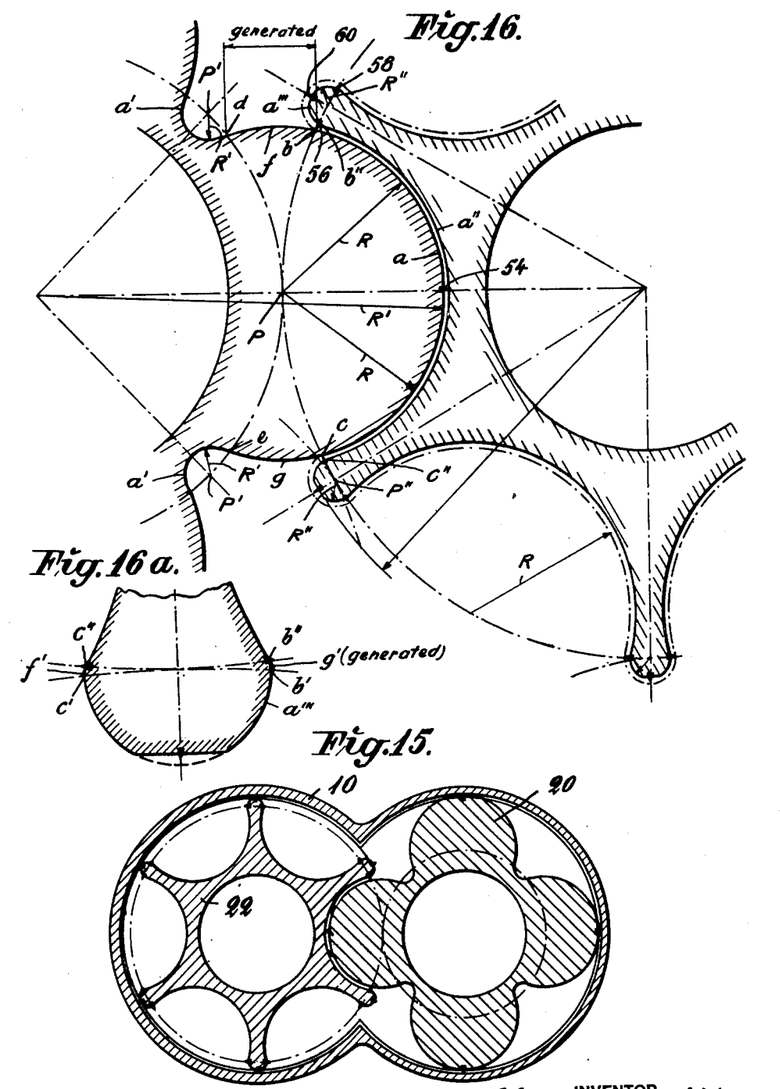
Fig. 15 is a section similar to Fig. 3 illustrating still another form of profile embodying the invention.
Fig. 16 is a fragmentary section on enlarged scale illustrating details of the profiles shown in Fig. 15.
Fig. 16(a) is a detail on still further enlarged scale of a part of the structure shown in Fig. 16.
Figure 18:
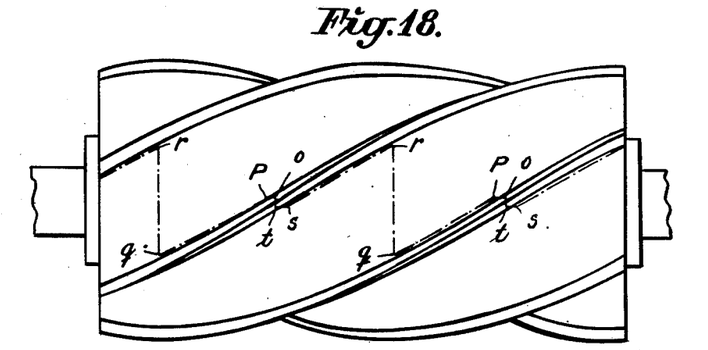

In Fig. 18 the sealing line on the female rotor is indicated, the portion $o$—$p$ obliquely following the generated surface $g'$ of the root portion of the female addendum; the portion $p$—$q$ following the line of intersection between the arcuate surface determined by the pitch circle of the female rotor, the seal-strip 56 in Fig. 16 just lying along this line and tightening against the generated surface $f$ of the male rotor; the portion $q$—$r$ extending at right angles to the axis of rotation of the rotor and following the arcuate portion *a"* of the profile as indicated: the portion *r—s* following the line of intersection between the arcuate surface *a"* and a cylindrical surface determined by the pitch circle of the rotor, the sealing strip 58 lying along this line and tightening against the generated surface *g* of the male rotor; the portion *s—t* obliquely following the generated surface *f"* of the rotor and the portion *t—o* extending at right angles to the axis of rotation following the arc *a'''* and co-operating with the arc *a'* of the male rotor. The same indications *o—p, p—q* etc. used for the different portions of the sealing lines of the two rotors shown in Figs. 17 and 18 correspond to co-operating parts of the rotors, so that it may be easy to follow the course.

As will be apparent from the drawings the length of the sealing line between the rotors is in this instance also relatively short as compared with a sealing line between lands and grooves having fully generated profiles. Further, it will be observed that the provision of addendum portions on the female lands and dedendum portions in the male grooves, does not in any way affect the fact that the crest lines of the male lands roll into sealing proximity with the groove walls at places inside the pitch circle of the female rotor, so that the advantages due to this and previously discussed are retained.

This rolling of the male lands into the female grooves, as distinguished from entry of the male lands into the female grooves with a sliding action (as explained in detail in connection with Figs. 6 to 8), is essentially due to the fact that the outer portion of the profile of the male land is, in accordance with the present invention, formed by a convexly curved line which, however, lies within the area defined between the flanks of a land of the same peripheral root width if the generated curves of the root portions were extrapolated to meet at the crest of the land. If the generated curves, or even one of them, is carried to the diameter of the crest of the land, then relative sliding action results with respect to the wall of a cooperating groove of proper profile, but if the outer part of the land profile is defined by a convexly curved line lying within the area inside that defined by a profile having fully generated flanks, then the land enters a cooperating groove with a rolling action which is productive of close or sealing proximity only after the land is well into or fully meshed within the groove.

Also, the variations from exact arcs of some portions of the profile, of the nature discussed in connection with Figs. 12 to 14, are not dependent upon the presence or absence of substantial addendums on the female lands.

It is characteristic of all of the embodiments shown that with the exception of the portions of the sealing line between the rotor lands and grooves which extend at right angles to the axis of rotation the clearance at the sealing line between the rotors may be established by the clearance between a surface on the one hand and a relatively narrow sealing or tightening strip or edge on the other hand. Also because of the facts that sealing or tightening edges can be used in the manner described, the clearance of the sealing line between the rotors and the barrels or bores of the casing can also be established between a surface on one hand and a narrow strip or edge on the other hand.

Thus over all portions of the sealing line which have an axial component of direction, which portions constitute a very large and usually the major portion of the total length of the sealing line defining the working chambers, the sealing line is defined between a surface and an edge rather than by two adjacent surfaces. Consequently if due to distortion caused by unequal expansion or by deflection resulting from mechanical strain, contact should occur between relatively moving parts along the sealing line, damage due to such contact is minimized because such contact will not be between relatively wide areas but only along the line of the sealing edge, and if the latter is worn or damaged it can readily be replaced. The transversely extending portions of the sealing line between the rotors, which are the only portions in which the clearance is established by the proximity of two surfaces, form only a very minor portion of the sealing line and as heretofore explained these portions of the sealing line can without difficulty be constructed with ample clearance to insure against rubbing contact between surfaces under any conditions approaching normal operation. Likewise, due to the ability to use sealing edges or strips to provide the major portion of the sealing line formed between the rotors and the casing, the designed clearances between the surfaces of these bodies may be proportionately substantially greater than otherwise would be the case, thus making manufacture easier and also cheaper since manufacturing tolerances need not be held to such close limits. At the same time, even better efficiency than with the smallest clearances practically to specify and reasonably attainable without the use of sealing edges may be obtainable with the present construction, since the thin sealing edges may be made designedly so that they may rub when the device is first assembled, subsequently wearing without damage when the machine is initially "run in" and thereafter providing the minimum possible clearance for a "space packed" seal.

Figure 19:
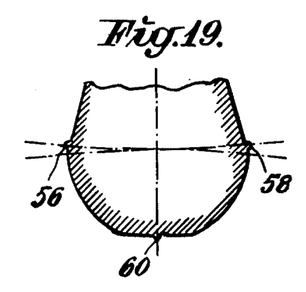
Figs. 19 and 20 are fragmentary sections on enlarged scale illustrating different forms of sealing edges usable with the invention.
Figure 20:
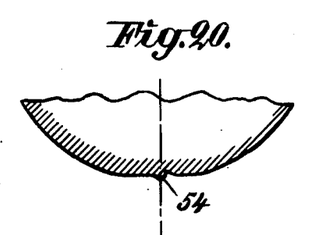

For purposes of illustration, separate sealing strips secured to the main bodies of the rotors have been shown by way of example but this particular form of construction need not necessarily be followed. For example, the sealing edges may be formed as integral parts of the rotor structures either when the rotors are machined, or by caulking or rolling operations resulting in the formation of integral projecting ribs or fins at the desired places. By way of example some forms of such construction are shown in Figs. 19 and 20. In Fig. 19 the outer portion of a female land is shown with material of the land rolled to provide integral sealing edges 56, 58 and 60, and in Fig. 20, the crest portion of a male land is shown provided with a sealing edge 54 machined so as to project radially from the crest of the land.

Also in accordance with previously known practice axially projecting circular sealing edges may be provided between the ends of the rotors and the ends of the casing such sealing edges lying at radii which bring them radially inside the bottom of the grooves of the respective rotors.

As will be more or less obvious from the foregoing, the invention is applicable to and includes a wide variety of specific forms of devices, of greatly different capacities and having a wide range of compression ratios. Characteristic of the structures, however, is the formation of working or compression chambers between lands having a substantial helix angle and a relation between helix angle and effective rotor length such that the working spaces are not defined by the intermeshing of successive convolutions of the same lands. Ordinarily, the relation of helix angle to effective rotor length is such that the extent of "wrap" of the male rotor lands from inlet to outlet will be not less than 90° and less than 360°.

As will be observed from comparison of Figs. 3 and 15 the ratio of male to female lands may vary and in some instances the ratio of female lands to male lands may be even greater than shown in Fig. 15. As this ratio increases, the wrap required for the female lands becomes less and may be considerably less than 90°, but the minimum wrap of the male rotor lands will ordinarily be as above stated.

As previously noted, devices to which the present invention is applicable may be operated either as a compressor or as an elastic fluid motor and in this connection it should be pointed out that the trapped pockets of substantial volume characteristic of profiles having one or both flanks generated to the crest of the land, which the present invention eliminates, have an adverse effect at the inlet end of the device whether the inlet end be the low pressure end, as is the case with a compressor, or the high pressure end, as is the case with a motor. In either case, at the inlet end, these trapped pockets are created as the rotors turn, increasing from zero volume to that existing when the crest of the male rotor passes out of the female groove, and such pockets therefore, by creating vacuum spaces unless vented, produce losses at the inlet as well as at the outlet ends of the device. When the present invention is used in a device employed as a motor, the high pressure fluid flows immediately and freely into the spaces between the rotor flanks and grooves, which would not be the case if the large trapped pockets characteristic of profiles having a generated flank were present. Also, generally characteristic of the profile, whether the crest portion be exactly circular or deviating slightly therefrom, is the fact that the male profile is "fatter" than a generated profile, with the flanks lying outside the lines of a fully generated profile for a land of the same height.

From the foregoing it will be apparent that the invention may be made use of in a wide variety of specific designs and also that if desired certain features of the invention may be employed to the exclusion of others. Its scope is therefore not to be considered as restricted to the apparatus herein illustrated and discussed for purposes of explanation, but is to be understood as embracing all forms of apparatus falling within the purview of the appended claims.

I claim:

1. A rotary device comprising a casing structure providing parallel intersecting bores and having inlet and outlet ports communicating with said bores, a first rotor rotatably mounted in a first bore and having helical lands of generally convex cross section with intervening grooves the major portions of which lie outside the pitch circle of the rotor, a second rotor mounted for rotation in a second bore and having helical lands of generally concave cross section and intervening grooves the major portions of which lie inside of the pitch circle of the rotor, said lands and grooves intermeshing and cooperating with each other and the casing structure to provide fluid working chambers in the device communicating with said ports as the rotors revolve, the convex lands of said first rotor having profiles the outer portions of which lie peripherally within the lines of a land having a root of the same peripheral width and flanks generated by points on the pitch circle of said second rotor, and the profile of the grooves of said second rotor being the envelopes developed by the convex lands of said first rotor in passing into and out of mesh with said second rotor, whereby as the rotors revolve the outer portions of the convex lands of said first rotor enter said grooves in peripherally spaced relation to the walls thereof, approach said walls to sealing proximity at fully meshed position and recede from said walls to leave the grooves in peripherally spaced relation from the walls thereof.

2. A device according to claim 1 in which the convex lands of said first rotor have substantially circular profiles.

3. A device as set forth in claim 1 in which the lands of said first rotor have substantially symmetrical profiles, the outer portions of which are substantially circular on an arc having its center at or closely adjacent to the pitch circle of the rotor and the inner portions of which are generated by points at or closely adjacent to the pitch circle of said second rotor.

4. A device as set forth in claim 1 in which the lands of said first rotor have substantially symmetrical profiles, the outer portions of which are substantially circular and the crest portions of which are slightly flattened as compared with an exact circular arc.

5. A device as set forth in claim 1 in which the lands of said first rotor have profiles, the outer portions of which on at least the pressure side of the land are curved to provide a portion lying peripherally slightly outside an exact circular arc struck from a center lying on the pitch circle of the rotor.

6. A device as set forth in claim 1 in which the lands of said first rotor have profiles the outer portions of which are substantially circular about a center lying slightly outside the pitch circle of the rotor.

7. A device as set forth in claim 1 in which both of said rotors have contiguous portions provided with lands of opposed helix angles and one of said ports is located to provide a common communication with working chambers formed in both of said portions.

8. A device as set forth in claim 1 in which the casing provides a passage for fluid communicating with one of said ports and leading therefrom, the portion of the wall of said passage immediately adjacent to the port being curved to smoothly merge with the bore in which said first rotor is located, whereby to form diffusor-like channels between the wall of said bore and the adjacent portion of the wall of said passage on the one hand and the convexly curved lands of said first rotor on the other hand for flow of fluid between the working chambers and said passage as the lands of said first rotor pass the edge of the port.

9. A device as set forth in claim 8 in which said passage leads from said port in a direction generally tangential with respect to the addendum region of said first rotor.

10. A device as set forth in claim 8 in which said passage leads from said port in a direction generally tangential with respect to the addendum region of said first rotor and is shaped to provide a diffusor-like passage extending from a throat portion adjacent to the port.

11. A device as set forth in claim 1 including sealing means extending longitudinally of the lands to provide thin sealing edges projecting radially at the crests of the lands of said first rotor and peripherally from the sides of the lands of said second rotor at or closely adjacent to the pitch circle of the second rotor.

12. A device as set forth in claim 1 including sealing means extending longitudinally from the lands to provide thin sealing edges projecting radially at the crests of the lands of said second rotor and grooves extending longitudinally along the bottoms of the grooves of said first rotor for receiving said projecting sealing edges when the lands and grooves are in fully meshed position.

13. A device as defined in claim 1 in which the outer part of each of the lands of at least one of the rotors has substantially symmetrical arcuate flank portions joined by an apex portion situated radially within the line defined by extrapolation of the arcs of said flanks to the radial center line of the land and a thin radially projecting sealing edge extending longitudinally of said apex portion.

14. A device as defined in claim 13 in which said one of said rotors is said first rotor and the extent to which said sealing edge projects is confined to the space radially within said extrapolated line.

15. A device as defined in claim 13 in which said one of said rotors is said second rotor and the extent to which said sealing edge projects is confined to the space radially within said extrapolated line.

16. A device as defined in claim 13 in which said apex portion comprises a substantially flat surface.

17. A device as set forth in claim 13 in which said sealing edge is formed by material of the land projecting from said apex portion.

18. For use in a device of the character described, a first rotor having helical grooves the bottom portions of which are of circular cross section, a second rotor having helical lands the outer portions of which have arcuate flanks of substantially the same radius as that of the bottoms of the grooves to provide surfaces mating with the grooves when the lands and grooves are fully meshed, each of the lands of said second rotor further having an apex portion extending longitudinally of the land and having a peripheral extent constituting only a minor fraction of the peripheral extent of the land and providing a space between the apex portion of the land and the bottom of a cooperating groove when the parts are fully meshed, and a thin sealing edge extending longitudinally of said apex portion and extending radially therefrom into said space.

19. A rotary device comprising a casing structure providing parallel intersecting bores and having inlet and outlet ports communicating with said bores, a first rotor rotatably mounted in a first bore and having helical lands of generally convex cross section with intervening grooves, a second rotor mounted for rotation in a second bore and having helical lands of generally concave cross section and intervening grooves, said lands and grooves intermeshing and cooperating with each other and the casing structure to provide fluid working chambers in the device communicating with said ports as the rotors revolve, the lands of said first rotor lying substantially entirely outside the pitch circle of the rotor and the lands of said second rotor lying substantially entirely inside the pitch circle of the rotor, the profile of the lands of said first rotor being substantially symmetrical and comprising an outer portion substantially circular on an arc struck from a center at or closely adjacent to the pitch circle of the rotor and inner flank portions generated by points at or closely adjacent to the pitch circle of said second rotor, the lands of said second rotor having profiles providing intervening grooves of substantially circular cross section and substantially the same radius as that of the circular portion of the profile of the lands of said first rotor.

20. For use in a rotary device of the character described, a pair of rotors adapted to intermesh and comprising a first rotor having helical lands and intervening grooves, the bottoms of said grooves lying substantially on the pitch circle of the rotor and a second rotor having helical lands and intervening grooves, the crests of the lands of the second rotor lying substantially on the pitch circle of the second rotor, thin sealing edges projecting radially at the crests of the lands of the second rotor and grooves extending longitudinally of the bottoms of the grooves of the first rotor for receiving said sealing edges when the lands and grooves are in fully meshed position.

21. A rotary device comprising a casing having inlet and outlet openings for fluid and rotors in said casing having intermeshing helical lands and grooves forming with the casing working chambers communicating with said openings as the rotors revolve, said rotors comprising a male rotor having lands of generally convex profile the major portions of which are situated outside the pitch circle and a female rotor having lands of generally concave profile the major portions of which are situated inside the pitch circle, each of the male rotor lands having a profile substantially symmetrical with respect to a radial center line and having root portions formed by curves generated by points on the adjacent female lands at or adjacent to the pitch circle of the female rotor, the radially outer ends of said generated curves terminating at places located radially materially short of the crest of the land and said profile being completed by a connecting line joining the outer ends of said generated curves, said connecting line being situated entirely inside the area between extrapolated portions of said generated curves extending from said places of termination to the common point of intersection of the curves with said center line and the end portions of said connecting line being convexly curved and disposed to merge smoothly with said generated curves at the places of juncture therewith, the profile of the cooperating female rotor groove being the envelope developed by the male land in passing into and out of mesh with the female rotor.

22. A device as set forth in claim 21, in which said connecting line is convexly curved and has a maximum radius of curvature not materially exceeding the height of the land.

23. A device as set forth in claim 21, in which the end portions of said connecting line are substantially circular arcs the tangents of which at the places of juncture with said generated curves are substantially coincident with the tangents of the generated curves at said places.

24. For use in a rotary device of the character described, a pair of cooperating rotors having helical intermeshing lands and grooves comprising a male rotor having lands the major portions of which lie outside the pitch circle of the rotor and are of substantially symmetrical convexly curved profile and the minor portions of which lie within the pitch circle of the rotor and are joined by grooves of substantially symmetrical concavely curved profile, and a female rotor having lands the major portions of which lie within the pitch circle of the rotor and are of substantially symmetrical concavely curved profile and the minor portions of which lie outside the pitch circle and are of substantially symmetrical convexly curved profile.

25. Rotor structure as set forth in claim 24 in which the radially outer parts of said major portions of the lands of the male rotor are substantially circular in profile with a radius of curvature having a center approximately at the pitch circle of the rotor and the grooves between the minor portions of the lands of the male rotor are substantially circular in profile, the major portions of the lands of the female rotor being substantially circular in profile and the minor portions of the lands of the female rotor being substantially circular in profile with a radius of curvature constituting only a minor fraction of the radius of the pitch circle of the rotor.

26. Rotor structure as set forth in claim 24 in which the convexly curved profile constituting the major portion of the profile of the lands of the male rotor is substantially circular and comprises a crest portion having a radius located at or adjacent to the pitch circle of the rotor and side flank portions generated by points lying on the pitch circle of the female rotor.

27. Rotor structure as set forth in claim 24 in which the male rotor has fewer lands and grooves than the female rotor, the peripheral spacing between the lands on the pitch circle of the female rotor being several times the peripheral extent of the female lands on the same circle and the peripheral extent of the lands of the male rotor on the pitch circle thereof being several times the peripheral spacing between the male lands on the same circle.

HANS ROBERT NILSSON.

REFERENCES CITED

The following references are of record in the file of this patent:

UNITED STATES PATENTS

| Number | Name | Date |
|---|---|---|
| 960,993 | Motsinger | June 7, 1910 |
| 1,142,734 | Sidwell | June 8, 1915 |
| 1,306,169 | Brooks, et al. | June 10, 1919 |
| 1,698,802 | Montelius | Jan. 15, 1929 |
| 1,821,523 | Montelius | Sept. 1, 1931 |
| 1,833,159 | Garnett | Nov. 24, 1931 |
| 1,861,155 | Douglas | May 31, 1932 |
| 1,965,557 | Montelius | July 3, 1934 |
| 1,991,541 | Cannizzaro | Feb. 19, 1935 |
| 2,174,522 | Lysholm | Oct. 3, 1939 |
| 2,243,874 | Lysholm | June 3, 1941 |
| 2,287,716 | Whitfield | June 23, 1942 |
| 2,410,172 | Lysholm | Oct. 29, 1946 |
| 2,473,234 | Whitfield | June 14, 1949 |

FOREIGN PATENTS

| Number | Country | Date |
|---|---|---|
| 437,042 | Great Britain | Oct. 23, 1935 |
| 464,494 | Great Britain | Apr. 16, 1937 |